Sept. 5, 1944.　　A. R. COLEMAN ET AL　　2,357,631
APPARATUS FOR FEEDING AND STACKING ARTICLES
Filed July 31, 1942　　2 Sheets-Sheet 2
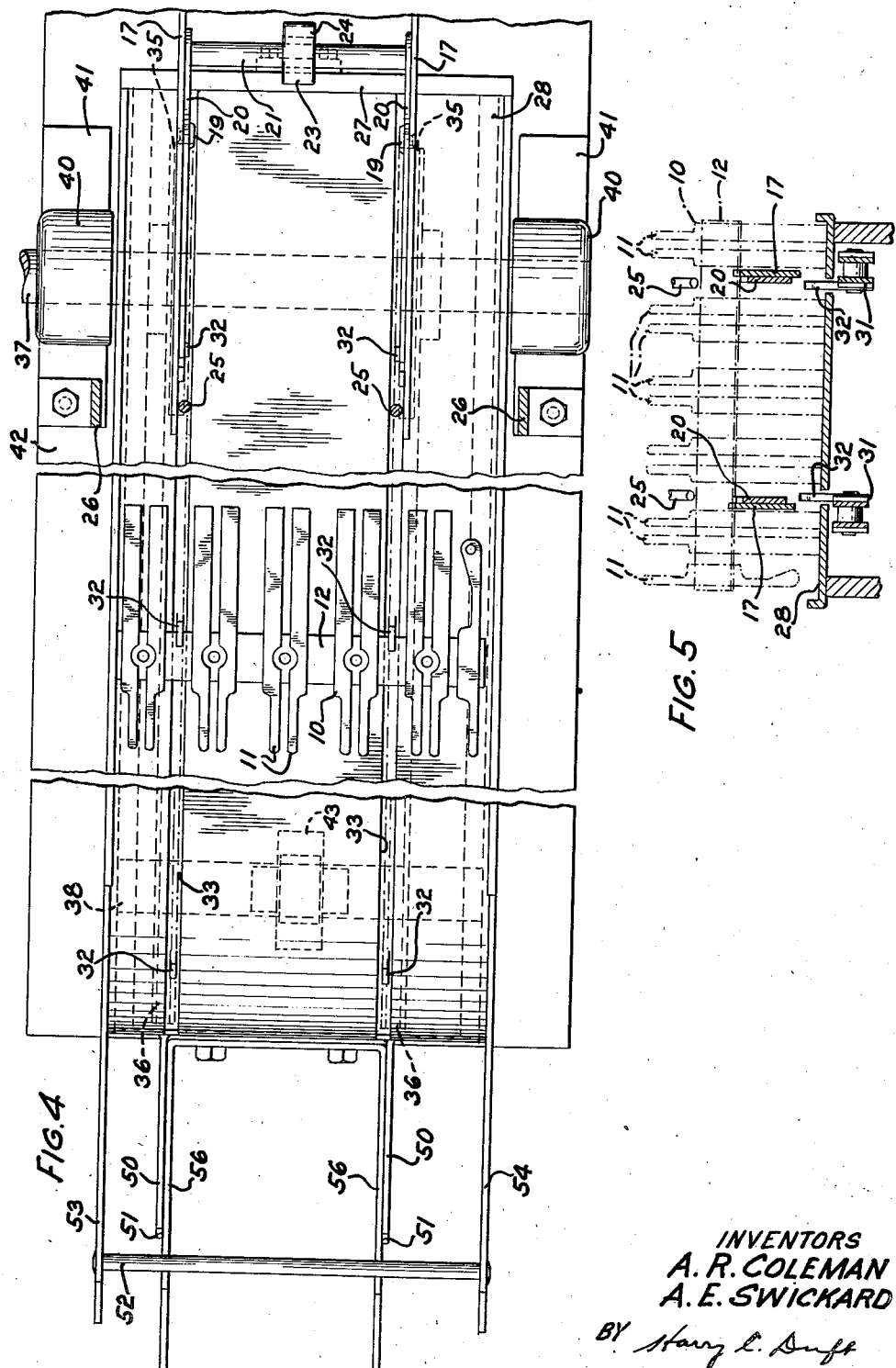
INVENTORS
A. R. COLEMAN
A. E. SWICKARD
BY Harry L. Duff
ATTORNEY Patented Sept. 5, 1944

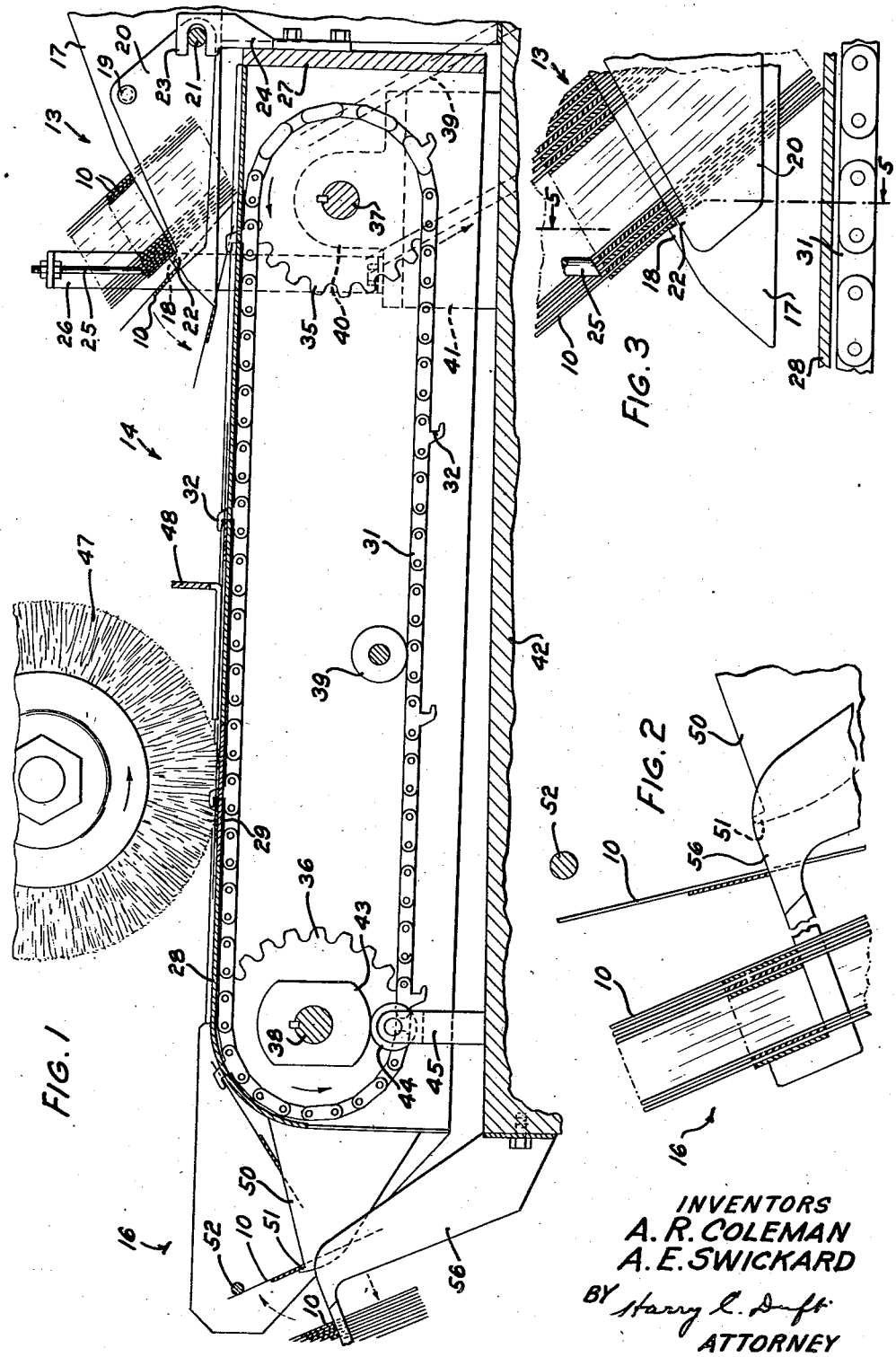

2,357,631

UNITED STATES PATENT OFFICE 2,357,631

APPARATUS FOR FEEDING AND STACKING ARTICLES

Albert R. Coleman, Berwyn, and Andrew E. Swickard, Chicago, Ill., assignors to Western Electric Company, Incorporated, New York, N. Y., a corporation of New York Application July 31, 1942, Serial No. 453,026

8 Claims. (Cl. 198—46)

This invention relates to article working apparatus and more particularly to an apparatus for feeding, brushing and stacking articles.

In the manufacture of multiple layer electrical apparatus, it is sometimes the practice to stamp the parts of the apparatus from a metal strip. For example, in the manufacture of cross bar assemblies such as sometimes used in certain types of telephone equipment, the contact springs are stamped from a continuous strip of metal and then the individual springs assembled in pairs on an insulating strip. These assemblies are then used to form a multiple layer contact spring bank. The assemblies are positioned as closely together as feasible in order to keep the size of the bank at a minimum. In the course of the stamping operation, however, small slivers or burrs of metal sometimes remain attached to the edges of the springs or adhere to the surface thereof. Unless these slivers are removed, since the springs of the assemblies are very close together, they may contact slivers on other springs or the other springs themselves and thereby cause short circuits. It is thus desirable that they be removed.

It has sometimes been the practice to remove these slivers by brushing the assemblies by hand. However, because these assemblies are necessarily made quite thin in order to keep the size of the ultimate bank at a minimum, they are relatively fragile and subject to breakage during handling. Thus, it is desirable to provide an apparatus which will remove these slivers from the springs quickly and efficiently while, at the same time, protecting the assemblies from breakage.

It is an object of the present invention to provide an efficient and effective article working apparatus such as an apparatus for feeding, brushing and stacking articles, such as contact spring assemblies used in certain types of telephone equipment.

In accordance with one embodiment of this invention, an apparatus is provided having a rack for storing articles to be cleaned and a conveyor positioned below said rack for carrying articles into contact with a rotating brush. A second rack is provided at the delivery end of said conveyor for receiving brushed articles. Means are associated with the conveyor and operate in synchronism therewith for feeding articles to the conveyor from the storage rack. Means associated with the conveyor and operating in synchronism therewith are also provided for positioning the brushed articles on the second rack.

Other objects and advantages of this invention will be apparent from the following detailed description taken in conjunction with the accompanying drawings, wherein:

Fig. 1 is a sectional side view of a feeding, brushing, and stacking apparatus constructed in accordance with one embodiment of this invention;

Fig. 2 is a detail side view of the stacking apparatus;

Fig. 3 is a detail side view of the feeding apparatus;

Fig. 4 is a plan view of the apparatus shown in Fig. 1, and

Fig. 5 is a vertical sectional view along the line 5—5 of Fig. 3.

Referring now to the drawings and particularly to Fig. 1, an apparatus is there shown for feeding cross bar contact spring assemblies 10 from a magazine 13 to a conveyor designated generally as 14. These assemblies comprise a number of stamped metal springs 11 which are attached to a supporting strip 12. The conveyor is designed to carry the assemblies into contact with a rotating brush 47 and then to deposit the brushed assemblies on a stacking device designated generally as 16. The apparatus may be more readily understood if the feeding, brushing, and stacking operations be considered separately.

In using this apparatus, the assemblies are first stacked by an operator on the magazine 13. This magazine comprises a pair of vertically mounted, stationary, parallel, spaced plates 17 positioned at one end of the conveyor and fixed to a base 42 of the apparatus. These plates have their upper edges shaped so as to form an inclined track on which the assemblies hang, as may be seen in Figs. 1 and 5, the insulating strip 12 resting on the upper edges of the plates. The inclination of the track is such that the assemblies will slide of their own accord down toward the conveyor. A pair of rocker plates 20, which are attached to the plates 17 by pivots 19, serve as a feed control and prevent the assemblies from sliding directly to the conveyor. The plates 20 are connected by a rod 21.

At the beginning of a cycle of operation, the article engaging end of the plates 20 is raised so that a projecting portion 22 engages the first assembly on the magazine and prevents it from sliding further. A bracket 24 having a slotted upper portion 23 is attached to an end plate 27 of the conveyor housing. The slotted portion engages the rod 21 which connects the plates 20. Thus, when the conveyor, which is itself pivotally supported on a shaft 37, is pivoted, this motion is transmitted to the rocker plates 20 and causes them to move relatively to the magazine plates 17, releasing the retained assemblies. The released assemblies then slide forward, by gravity, to contact shoulders 18 on the magazine plates 17. These shoulders are spaced the thickness of an assembly beyond the forward edge of the projection 22, as may be seen in Fig. 3, so that the assemblies, with each reciprocation of the plates 20, may move forward the thickness of one assembly. The assemblies are then halted by the shoulders 18, and as the bracket 24 moves downward causing the projecting portion 22 of the retaining plates 20 to move upward, the first assembly in line is engaged by the upper edge of the projecting portion 22 and lifted onto the upper edge of the shoulders 18 of the plates 17. This assembly then slides forward of its own accord along the upper edge of these shoulders and drops onto the conveyor. In order to prevent the assembly behind the first assembly in line from being moved upward with the first assembly as it is raised onto the upper edge of the shoulders, a pair of rods 25, supported by a stationary bracket 26, are mounted above and near the lower end of the magazine plates 17, and extend downward a sufficient distance, as may be seen in Fig. 1, to engage the upper edge of the insulating strip to which the springs of the next assembly in line on the magazine are attached, while the first assembly is being raised. These rods are threaded to the stationary bracket 26 and may be closely adjusted.

The conveyor onto which the assembly drops comprises a pair of chains 31 provided with dogs 32 which engage the insulating strip 12 of the assembly as the assembly drops on the conveyor, and thus serve to prevent back-slipping as the assembly contacts the brush. As may be seen in Fig. 4, the chains run in slots 33 which are provided in the upper surface 28 of the conveyor housing. This upper surface is made smooth so that the assemblies may be moved along it by the chains with a minimum of friction. The operation of the device is so timed that, as the assembly falls, a pair of dogs are in position just behind the supporting strip 12 of the assembly and thus, when assembly is pushed backwards by the brush, which rotates counter to the direction of movement of the conveyor, the assembly is immediately engaged by the dogs and prevented from sliding further.

The chains are supported by two pairs of sprocket wheels 35 and 36, one pair of the wheels being mounted near either end of the conveyor housing, as may be seen in Figs. 1 and 4. The sprocket wheels are keyed to their respective shafts 37 and 38. Shaft 37, which is driven by a belt 39, also serves as a support for the conveyor and is supported at either end by a pair of bearing blocks 40 which are bolted to a block 41 which is, in turn, mounted on a base member 42 and serves as a base for the entire apparatus. A pair of idler rollers 39 engage the chains, as shown in Fig. 1, and serve to keep them taut. It is necessary that the chains be taut so that the assemblies will be properly engaged by the dogs and will be brought into satisfactory contact with the brush 47.

Shaft 38, which supports the sprocket wheels 36, is provided with a cam 43 which is keyed thereto and positioned at the mid-point thereof. This cam rests on a roller 44 rotatably mounted on a bracket 45 stationarily attached to the base of the apparatus. This bracket may, if desired, be made adjustable to compensate for brush wear. The cam and the roller serve as a support for the delivery end of the conveyor and, since the cam is keyed to the same shaft as that to which the sprocket wheels 36 are keyed and since the sprocket wheels are driven by the chains 31, the cam is rotated thereby. As the recessed portions of the cam engage the roller 41, the delivery end of the conveyor pivots downwardly while the other end, which is supported by the shaft 37 and at which the assemblies are first positioned on the conveyor, moves upwardly. This upward movement, as already explained, causes the bracket 24 to pivot the rocker plates 20 and thus to cause an assembly to be fed onto the conveyor.

As the assembly is carried forward by the conveyor, it is first engaged by a guide member 48 positioned just ahead of the brush 47. This guide member serves to prevent the assembly from buckling in the middle while the dogs on the chains keep the assembly from lifting at the sides. The operation of the apparatus is so timed that, when the assembly reaches the guide member 48, the conveyor is not fully elevated and thus the assembly passes freely underneath the guide member. By the time, however, the assembly reaches the brush which is positioned just beyond the guide member 48, the housing is fully elevated and maximum contact is made with the brush, while the guide member cooperates with the dogs on the chains to hold the assembly substantially flat. This intermittent contact has the desirable effect of reducing wear on the surface of the housing contacted by the brush. The portion of the upper surface of the conveyor housing which is contacted by the brush is, however, provided with a removable insert 29 of hardened steel. In the course of use, this portion of the housing is subject to considerable wear and thus, by making this portion of the housing replaceable, the upkeep cost of the apparatus is kept at a minimum.

After the assembly has passed underneath the brush, with which it is brought into contact when the conveyor is raised by the cam 43, the assembly reaches the delivery or stacking end of the conveyor. As the assembly reaches this end, it is projected onto an inclined chute or track comprising a pair of vertically positioned parallel plates 50 which are attached to the delivery end of the conveyor housing. The insulating strip 12, which supports the springs, rests on the upper edge of these plates, as shown in Fig. 1. Since the assemblies are fed onto the conveyor with the longer portion of the springs extending backwards, as shown in Fig. 4, the weight of this longer portion will cause that portion to pivot downwardly when the assemblies are projected onto the plates 50. At the same time, since the upper edges of the plates 50 are inclined similarly to the upper edges of the plates 17 and 20, the assembly slides toward the end of the track where lugs 51, at the lower edge of the plates 50, halt their forward progress. A rod 52 is mounted between a pair of bracket plates 53 and 54 and move the lugs 51 of the plates 50 so that, as the assembly pivots into an upright position, the upper end of the assembly will engage the rod and further pivoting will be prevented; this prevents oscillating which might tend to cause jamming. As the operation of the machine continues, the delivery end of the conveyor again moves downward and the supporting plates 50, being mounted thereon, also move downward relatively to a pair of bracket arms 56 which are stationarily mounted on the base 42 of the apparatus. This downward movement of the supporting plates 50 deposits the assembly, as may be seen in Fig. 2, on the upper edge of the bracket arms 56. These upper edges are inclined so as to form a chute on which the assembly may slide downward and into a receptacle, such as a basket or rack.

While but one embodiment of this invention has been shown and described, it will be understood that many alterations and changes may be made therein without departing from the spirit or scope of the present invention.

What is claimed is:

1. In an article working apparatus, a magazine for supporting an article, a pivotally mounted conveyor, means for pivoting said conveyor and means responsive to the pivoting of said conveyor for feeding an article from said magazine to said conveyor, said feeding means comprising a pair of plates provided with lugs for engaging and releasing articles from said magazine, and means associated with said magazine for preventing more than one article being released from said magazine at one time.

2. In an article working apparatus, a pivotally mounted conveyor, means for pivoting said conveyor, a chute for receiving an article from said conveyor, said chute being mounted on said conveyor and provided with an article stopping means near its lower end, and a second chute stationarily mounted adjacent said first chute to receive an article therefrom as said first chute is moved downward relatively to said second chute by said conveyor.

3. In an article working apparatus, a pivotally mounted conveyor, means for pivoting said conveyor, a chute for receiving an article from said conveyor, said chute being mounted on said conveyor and provided with an article stopping means near its lower end, a second chute stationarily mounted adjacent said first chute to receive an article therefrom as said first chute is moved downward relatively to said second chute by said conveyor, and means cooperating with said first chute for positioning articles on said second chute.

4. In an article working apparatus, an oscillatively mounted conveyor, a magazine for supplying an article to said conveyor, a shoulder for retaining an article thereon, a feeding member movably mounted so that, in one position into which it is moved, an article on said magazine will move forward to engage said shoulder on said magazine while, when moved into a second position, it raises the article over said shoulder and interposes itself ahead of said shoulder to prevent other articles from moving down said magazine, and means for moving said feeding member in response to the oscillatory movement of said conveyor.

5. In an article working apparatus, an oscillatively mounted conveyor, a magazine for supplying an article to said conveyor, a shoulder for retaining an article thereon, a feeding member movably mounted so that, in one position into which it is moved, an article on said magazine will move forward to engage said shoulder on said magazine while, when moved into a second position, it raises the article over said shoulder and interposes itself ahead of said shoulder to prevent other articles from moving down said magazine, means for moving said feeding member in response to the oscillatory movement of said conveyor, and means associated with said feeding means for limiting the number of articles to be elevated by said feeding means.

6. In an article working apparatus, a pivotally mounted conveyor, means for pivoting said conveyor, a magazine for supplying an article to said conveyor, a shoulder for retaining an article thereon, a feeding member associated with said conveyor so that in one position it permits an article on said magazine to move forward to engage said shoulder of said magazine, while, as it moves into another position, it raises the article over said shoulder and interposes itself ahead of said shoulder to prevent other articles from moving down said magazine, a chute for receiving articles from said conveyor, said chute being mounted on said conveyor, said chute being provided with means for halting an article near its lower end, and a second chute stationarily mounted adjacent said first chute to receive an article therefrom as said first chute is moved relatively to said second chute by said conveyor.

7. In an article working apparatus, a pivotally mounted conveyor, a magazine associated with said conveyor, a raised portion on said magazine for retaining an article thereon, an inclined member extending from said raised portion to said conveyor, and means operable in response to the pivoting of said conveyor and associated with said magazine for raising an article over said raised portion of the magazine and depositing it on said inclined member.

8. In an article working apparatus, a pivotally mounted conveyor, a magazine associated with said conveyor, a raised portion on said magazine for retaining an article thereon, an inclined member extending from said raised portion to said conveyor, means operable in response to the pivoting of said conveyor and associated with said magazine for raising an article over said raised portion of the magazine and depositing it on said inclined member, and means associated with said transfer means for preventing more than a predetermined number of articles from being transferred by said article transferring means.

ALBERT R. COLEMAN.
ANDREW E. SWICKARD.